United States Patent [19]

Maeno et al.

[11] Patent Number: 4,666,274
[45] Date of Patent: May 19, 1987

[54] WATERPROOF CAMERA

[75] Inventors: Hiroshi Maeno; Michio Yoshida; Hideo Tamamura, all of Tokyo, Japan

[73] Assignee: Canon Kabushiki Kaisha, Tokyo, Japan

[21] Appl. No.: 783,849

[22] Filed: Oct. 3, 1985

[30] Foreign Application Priority Data

| Oct. 5, 1984 | [JP] | Japan | 59-151541[U] |
| Oct. 5, 1984 | [JP] | Japan | 59-151542[U] |
| Oct. 5, 1984 | [JP] | Japan | 59-151543[U] |
| Oct. 5, 1984 | [JP] | Japan | 59-151544[U] |
| Oct. 5, 1984 | [JP] | Japan | 59-151545[U] |

[51] Int. Cl.$^4$ .................................. G03B 17/08
[52] U.S. Cl. .......................... 354/64; 354/288; 354/295
[58] Field of Search .............. 354/64, 288, 295, 145.1; 224/908, 909

[56] References Cited

U.S. PATENT DOCUMENTS

| 2,565,006 | 8/1951 | Trickey | 224/908 |
| 3,205,800 | 9/1965 | Peterson | 354/288 |
| 3,938,166 | 2/1976 | Sloop | 224/908 |
| 4,041,507 | 8/1977 | Ko et al. | 354/64 |
| 4,176,701 | 12/1979 | Welgan | 354/64 |
| 4,219,264 | 8/1980 | Rodeck | 354/295 |
| 4,232,808 | 11/1980 | Gray | 224/909 |
| 4,236,658 | 12/1980 | Kallman | 224/909 |
| 4,349,266 | 9/1982 | Maeda et al. | 354/288 |

Primary Examiner—A. A. Mathews
Attorney, Agent, or Firm—Toren, McGeady and Goldberg

[57] ABSTRACT

A waterproof camera having portions liable to crack, or when scratched, to cause a loss of the optical performance is provided with a support frame in front of these portions to protect them. This support frame is made of elastic material, and is secured to the camera body by an expandable band.

12 Claims, 4 Drawing Figures

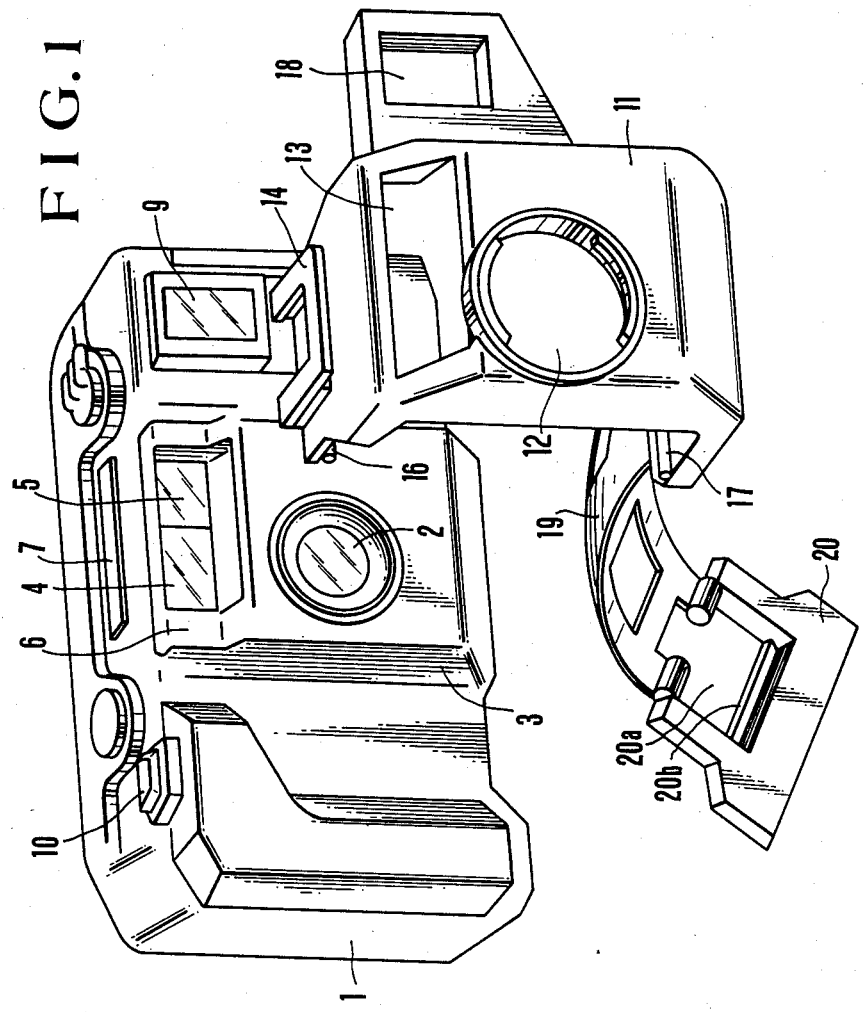

WATERPROOF CAMERA

BACKGROUND OF THE INVENTION

1. Field of the Invention:

This invention relates to a protector for a waterproof camera to protect portions liable to crack.

2. Description of the Prior Art:

The waterproof cameras were generally developed in adaptation to underwater photography, and their housing were required to be air-tight, and rigid in structure and resulted in a large bulk and size.

Recently, however, as it is desired that the waterproof camera while preserving the capability of underwater photography is also feasible in a similar manner to the ordinary cameras even in the photography of skiing, fishing, or swimming in rivers, pools, the sea, or lakes without consciousness of water, there are increasing demands for a general-purpose type of waterproof camera with reduction of the bulk and size thereof.

Such a general-purpose type water proof camera with too large an emphasis on the reduction of the size and the good manageability as has been described above, tends to be somewhat insufficient in rigidity.

For this reason, particularly in underwater photography where the user becomes dull in awareness, the possibility of the accidental contact of the camera with rocks or the like to result in cracking or breaking the protection glasses of the finder or the strobe is caused to increase. In the case of on-land photography, even if the protection glass is broken, it would be possible to take a picture. But when under water, as the interior of the camera is filled with water through the broken protection glass, not only shootings would no longer be possible, but also the camera itself could no longer work and further the exposed frames of film would be damaged.

SUMMARY OF THE INVENTION

An object of the present invention is to provide a protector for a waterproof camera which is able to protect liable-to-crack portions of the waterproof camera.

Another object is to provide a protector for a waterproof camera which is not to be accidentally released from the camera body even when a shock, for example, a flush of water or an ordinary impact, is given from the outside.

Still another object is to provide a protector for a waterproof camera which is able to soften the shock to the waterproof camera.

A further object is to provide a protector of light weight and small size for a waterproof camera.

Other objects will become apparent from the following description of embodiments thereof.

BRIEF DESCRIPTION OF THE DRAWINGS

FIG. 1 is a perspective view of an embodiment of the invention.

DETAILED DESCRIPTION OF THE PREFERRED EMBODIMENTS

Figure 3:
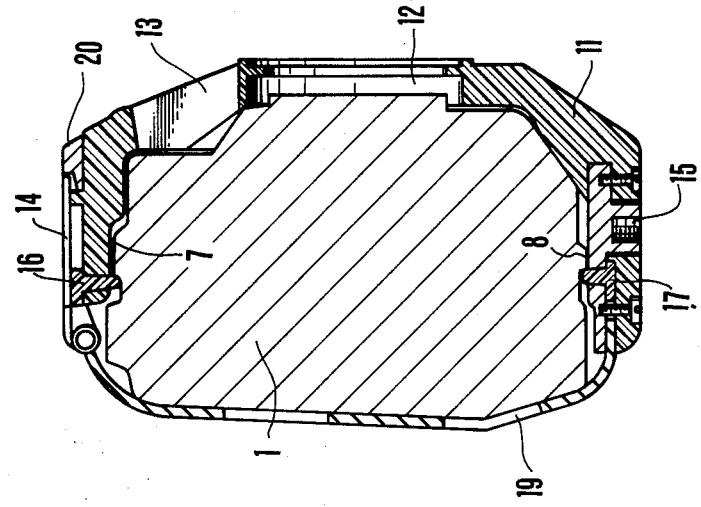
FIG. 3 illustrates the attaching of the support frame of FIG. 1 to the body of the camera.

In FIG. 1, 1 is a camera body capable of automatic winding and rewinding film. This camera body 1 is a waterproof camera with a water-tight housing. A photographic lens 2 is surrounded by a slight protuberance of the front panel of the camera housing 1 in such a way as to form a lens barrel portion 3. A finder 4 is positioned upwardly of the lens 2 and has a protection glass. A light sensor 5 is positioned adjacent to the finder 4 and has a protection glass. The finder 4 and sensor 5 are surrounded by a frame 6 formed as extending from the barrel portion 3 protruding from the neighbor of the photographic lens 2. Therefore, by this frame 6 and the lens barrel portion 3 the central portion of the front of the camera body 1 is protruded in a band form from the bottom to the top. The upper and lower panels of the camera housing 1 which are contiguous to this protruded band-like portion are formed to almost flat a shape and have projections 7 and 8 formed in portions thereof.

Figure 2:
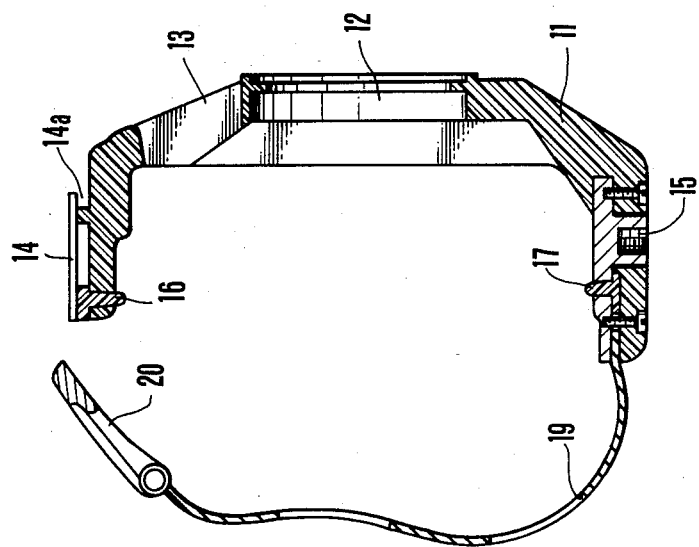
FIG. 2 is a sectional view of the support frame of FIG. 1.

9 is a strobe protected by a protection glass. 10 is a release button. 11 is a support frame to be attached to the camera body 1, and made of an elastic material such as rubber. This support frame 11 comprises a base plate, bent side plates and an extension. The bending form of this support frame 11 is conformed to the front protruding shape of the front panel and the top and bottom panel of the camera housing 1. And, the base plate of the support frame 11 is provided with an opening 12 for exposure and another opening 13 for the finder and light sensor. When the support frame 11 is attached to the camera, the round opening 12 is axially aligned with the lens 2, and the rectangular opening 13 is aligned with the windows of the finder 4 and light sensor 5. At the side wall of the round opening 12 there is provided a bayonet for coupling with a close-up lens. One of the side plates of the support frame 11 fixedly carries an accessory shoe 14, and the other has a screw-threaded hole 15 for a tripod as shown in FIG. 2. The shoe 14 is formed as protruding from the surface of the side plate, and its front side wall is recessed to provide an engagement groove 14a of a prescribed width.

Also, both side plates of the support frame 11 are provided with respective elastic portions 16 and 17 on the inner surfaces thereof arranged to overrun the projected portions 7 and 8 and then fit in grooves. The extension of the support frame 11 is provided with an opening 18 for strobe. This extension functions as a finger touch preventing frame for the strobe 9, so that the strobe 9 is prevented from being blocked by a finger when the camera is hand-held. This is important to the waterproof camera which is unable to pop up the strobe 9. An expandable belt 19 made of, for example, rubber, is fixedly secured at one end thereof to the rear end of the bottom plate of the support frame 11 and has a lock member 20 at the other end thereof. This lock member 20 is similar in shape to the top plate of the support frame 11. The belt mounting side of this lock member 20 is formed to a cutout portion 20a in conformance with the shoe 14. The back side of this cutout portion 20a is formed with a stepped portion 20b to engage in the groove 14a of the shoe 14.

When to attach the support frame 11 to the camera body 1, the operator holds the camera body 1 by one hand and the support frame 11 by the other hand and then brings them into contact while the round opening 12 of the base plate and the photographic lens 2 are in axial alignment. Then, the support frame 11 is pushed toward the camera. During this time, the side plates are resiliently bent outward. Therefore, the resilient forces of the side plates of the support frame 11 clamp the camera body 1. Then the support frame 11 is further pushed in to the bent shape of the support frame 11 coincides with the front shape of the camera body 1, thereby the resilient portions 16 and 17 are moved over the projections 7 and 8 on the top and bottom panels of the camera housing 1 to the grooves. Thus, the inserting operation is terminated. After that, the operator grasps the lock member 20 and expands the belt 19 to put the cutout portion 20a of the lock member 20 on the shoe 14. Then when the operator removes his hand from grasping the lock member 20, the stepped portion 20b enters the engagement groove 14a of the shoe 14 automatically. Thus, the locking operation is terminated. Since, at this time, the lock member 20 is being pulled backward by the tensioned belt 19, the locking connection is held steadily. Now the attaching of the support frame 11 to the camera body 1 is completed, so that the support frame 11 and the camera body 1 are unified. In this state, the lock member 20 and the shoe 14 form a common plane as shown in FIG. 3. After that, a sport finder may be mounted at the accessory shoe 14 of the support frame 11, or a tripod or a close-up tool may be engaged at the screw-threaded hole 15.

The use of such a support frame 11 on the camera body 1 provides a great reduction of the possibility for the photographic lens 2, finder 4, light sensor 5 and strobe 9 to contact with external objects, because these portions are positioned in the openings 12, 13 and 18 respectively. In other words, the important portions of the camera are protected against damages.

Figure 4:
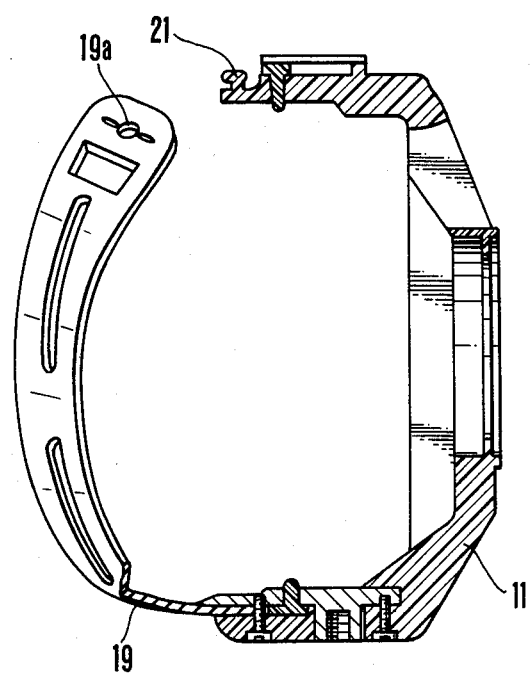
FIG. 4 is a sectional view of another example of the lock portion of the support frame.

Though, in the foregoing embodiment, the locking is effected by utilizing the protruding form of the shoe 14, the present invention is not confined thereto. As shown in FIG. 4, an engagement pin 21 may otherwise be used as arranged at the rear of the shoe 14, or this pin may be in the form of a projected portion of the camera housing, whereby the lock member of the belt 19 can be constructed in a simpler form of a hole 19a directly bored therein. Another example of modification is that the locking means are put on the bottom side plate of the support frame 11.

As has been described in greater detail above, according to the invention, those parts of the camera which are liable to crack, or which, when scratched, cause a great loss in the optical performance take their places deep in the interior of the openings of the support frame so that even if the camera is hit, the protection glass for the lens, finder, or strobe is seldom broken. Also, as shown in the embodiment of the invention, the important portions of the camera body are covered by the elastic protector, thereby giving an additional advantage that even when the camera is let fall, the shock to the camera can be softened, and the camera can be prevented from a damage. Further, when not only the clamping action but also the belt is used in holding the support frame on the camera as in the illustrated embodiment, there is no possibility of occurrence of detaching of the support frame from the camera body despite the camera is used under water against a strong resistance of water current, or a shock is given to the support frame. A furthermore advantage is produced from the use of one of the side plate of the support frame for providing the accessory shoe and the other side plate for providing a screw-threaded hole for the tripod as shown in the embodiment to facilitate reducing of the size of the camera body, lightening of its weight, and lowering of its production cost.

What is claimed is:

1. A waterproof camera system comprising: a camera body, the camera body including:
   (a) a taking lens; and
   (b) a finder optical system; and
   (c) a protector releasably attached to said camera body, said protector having a first opening provided in a position to align with said taking lens and a second opening provided in a position to align with said finder optical system wherein said protector further includes an accessory shoe.

2. A waterproof camera system according to claim 1, wherein said protector is made of elastic material.

3. A waterproof camera system according to claim 1, wherein said protector further includes an upper engaging portion for engagement with a first engaging portion of the camera and a lower engaging portion for engagement with a second engaging portion provided in the lower portion of the camera.

4. A waterproof camera system according to claim 1, wherein said accessory shoe is provided above said second opening.

5. A waterproof camera system according to claim 4, further comprising:
   a tightening member coupled to said protector to squeeze said protector to said camera body.

6. A waterproof camera system according to claim 5, wherein said tightening member is formed to an expandable band.

7. A waterproof camera system according to claim 6, wherein said tightening member is provided with an engaging portion for engagement with said accessory shoe.

8. A waterproof camera system according to claim 1, wherein said protector is provided with a mounting member for a tripod.

9. A waterproof camera system according to claim 8, wherein said mounting member of said protector is a screw-threaded hole for said tripod.

10. A protector for a camera having a taking lens comprising:
    (a) a first opening provided in alignment with said taking lens;
    (b) a tightening member provided to squeeze said first opening to said camera;
    (c) a first support frame extending from said first opening so as to conform with the lower portion of said camera; and
    (d) a second support frame extending from the end portion of said taking lens so as to conform with the upper portion of said camera, wherein said second support frame is provided with an accessory shoe having an engaging portion for said tightening member.

11. A protector according to claim 10, wherein said protector is made of elastic material.

12. A protector according to claim 10, wherein said tightening member is formed by an expandable band.

* * * * *